(12) United States Patent
Yao et al.

(10) Patent No.: US 7,627,564 B2
(45) Date of Patent: Dec. 1, 2009

(54) HIGH SCALE ADAPTIVE SEARCH SYSTEMS AND METHODS

(75) Inventors: Qi Yao, Sammamish, WA (US); Jun Liu, Bellevue, WA (US); Sanjeev Katariya, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 285 days.

(21) Appl. No.: 11/157,600

(22) Filed: Jun. 21, 2005

(65) Prior Publication Data

US 2006/0287993 A1    Dec. 21, 2006

(51) Int. Cl.
G06F 17/30    (2006.01)

(52) U.S. Cl. .................. 707/4; 707/5; 707/7; 706/45
(58) Field of Classification Search .............. None
See application file for complete search history.

(56) References Cited

U.S. PATENT DOCUMENTS

| | | | |
|---|---|---|---|
| 6,601,075 B1 * | 7/2003 | Huang et al. | 707/104.1 |
| 6,766,320 B1 * | 7/2004 | Wang et al. | 707/5 |
| 6,954,755 B2 * | 10/2005 | Reisman | 707/10 |
| 7,111,002 B2 * | 9/2006 | Zhang et al. | 707/5 |
| 7,197,497 B2 * | 3/2007 | Cossock | 707/7 |
| 7,257,577 B2 * | 8/2007 | Fagin et al. | 707/7 |
| 7,519,529 B1 * | 4/2009 | Horvitz | 704/7 |
| 7,546,293 B2 * | 6/2009 | Zhang et al. | 707/4 |
| 2002/0138478 A1 * | 9/2002 | Schwartz et al. | 707/3 |
| 2003/0135490 A1 * | 7/2003 | Barrett et al. | 707/3 |
| 2003/0172075 A1 * | 9/2003 | Reisman | 707/10 |
| 2004/0261026 A1 * | 12/2004 | Corson | 715/704 |
| 2005/0060297 A1 * | 3/2005 | Najork | 707/3 |
| 2005/0149498 A1 * | 7/2005 | Lawrence et al. | 707/3 |
| 2005/0149504 A1 * | 7/2005 | Ratnaparkhi | 707/3 |
| 2005/0289102 A1 * | 12/2005 | Das et al. | 707/1 |
| 2006/0143254 A1 * | 6/2006 | Chen et al. | 707/205 |
| 2006/0224579 A1 * | 10/2006 | Zheng | 707/5 |
| 2006/0253428 A1 * | 11/2006 | Katariya et al. | 707/3 |

* cited by examiner

*Primary Examiner*—Neveen Abel Jalil
*Assistant Examiner*—Christyann R Pulliam
(74) *Attorney, Agent, or Firm*—Merchant & Gould P.C.

(57) ABSTRACT

The subject invention relates to systems and methods that employ automated learning techniques to database and information retrieval systems in order to facilitate knowledge capabilities for users and systems. In one aspect, an adaptive information retrieval system is provided. The system includes a database component to store structured and unstructured data values. A search component queries the data values from the database, wherein a learning component associated with the search component or the database component is provided to facilitate retrieval of desired information.

15 Claims, 9 Drawing Sheets

HIGH SCALE ADAPTIVE SEARCH SYSTEMS AND METHODS

TECHNICAL FIELD

The subject invention relates generally to computer systems, and more particularly, relates to systems and methods that employ adaptive machine learning techniques in the context of natural language searches and database engines to facilitate efficient information retrieval.

BACKGROUND OF THE INVENTION

Database and information retrieval (IR) are two types of technology that have produced various tools such as the relational database management system (RDBMS) and the web search engine. However, historically, these two areas have largely developed independently even though they share one overriding objective, management of data. It is generally known that traditional IR systems do not take advantage of the structure of data, or metadata, very well. Conversely, relational database systems tend to have limited support for handling unstructured text. Major database vendors do offer sophisticated IR tools that are closely integrated with their database engines, for example, ORACLE TEXT™ and IBM DB2® Text Information Extender. These tools offer a full range of options, from Boolean, to ranked, to fuzzy search. However, each text index is defined over a single relational column. Hence, significant storage overhead is incurred, first by storing plain text in a relational column, and again by the inverted index built by the text search tool. These tools offer various extensions to the traditional relational database, but do not address the full range of IR requirements.

There has been work in the past investigating the use of relational databases to build inverted index-based information retrieval systems. There are several advantages to such an approach. A pure relational implementation using standard SQL offers portability across multiple hardware platforms, OS, and database vendors. Such a system does not require software modification in order to scale on a parallel machine, as the DBMS takes care of data partitioning and parallel query processing. Use of a relational system enables searching over structured metadata in conjunction with traditional IR queries. The DBMS also provides features such as transactions, concurrent queries, and failure recovery.

Many of the previous techniques have selected one relational implementation and compared it with a special-purpose IR system. Some of the methods have focused on a particular advantage, such as scalability on a parallel cluster. Several vendors have selected a single relational implementation and compared its performance with a baseline special purpose IR system. More recent techniques have shown that Boolean, proximity, and vector space ranked model searching can be effectively implemented as standard relations while offering satisfactory performance when compared to a baseline traditional IR system. Other systems have focused on a single advantage of relational implementations over traditional IR inverted index. One of the principle drawbacks to existing IR technologies is that the focus has been on retrieving documents or files that most closely match a give query. Although this approach often locates one or more relevant documents in view of the query, the quest for knowledge is usually just at the beginning stage since the user then has to read and analyze a retrieved file to determine if their quest for knowledge has been properly satisfied.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention relates to systems and methods that employ machine learning techniques to facilitate efficient searching, retrieval, and analysis of information. In one aspect, a language processor, search engine and highly scalable relational database are adapted with various learning algorithms to enhance the quality and efficiency of information searching. The learning component can adapt the system via implicit and/or explicit feedback overtime to more closely facilitate the actual quest for information to be satisfied in contrast to merely retrieving the most relevant documents or files. The learning can be in response to the types of queries, from the structure of data in the database, from implicit queues and/or other circumstances which indicate the actual information goal of the user. For example, rather than merely offering a guide to further information on a topic, the subject invention can infer the potential problem posed by a user and attempt to provide an automated answer or solve the problem directly such as in an application environment for instance (e.g., rather than providing a help file for a user to determine how to perform an activity in an application, perform the activity directly by inferring the desired solution).

In general, there have been many efforts to combine structured search with fuzzy text search. The subject invention provides a high-scale adaptive search platform in an attempt to further searching technologies by combining machine learning techniques that impact query term modeling for ranked retrieval into a fuzzy text and structured retrieval systems. The system employs "feedback" integral to ranked retrieval in a performant manner while leveraging data segmentation, scaling and management schemes offered by an industry scale structured store. Thus, a scalable approach is provided for integrating statistical machine learning techniques with classical IR techniques within a structured store acting as a core indexing and retrieval processor.

To the accomplishment of the foregoing and related ends, certain illustrative aspects of the invention are described herein in connection with the following description and the annexed drawings. These aspects are indicative of various ways in which the invention may be practiced, all of which are intended to be covered by the subject invention. Other advantages and novel features of the invention may become apparent from the following detailed description of the invention when considered in conjunction with the drawings.

DETAILED DESCRIPTION OF THE INVENTION

The subject invention relates to systems and methods that employ automated learning techniques to database and information retrieval systems in order to facilitate knowledge capabilities for users and systems. In one aspect, an adaptive information retrieval system is provided. The system includes a database component (e.g., relational database) to store structured and unstructured data values. A search component queries the data values from the database, wherein a learning component associated with the search component or the database component is provided to facilitate retrieval of desired information. The learning component can utilize various statistical models and methods such as Bayesian classification techniques, whereas the search component which includes local or remote search capabilities can employ a natural language processor to facilitate desired information processing.

As used in this application, the terms "component," "system," "engine," "query," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Figure 1:
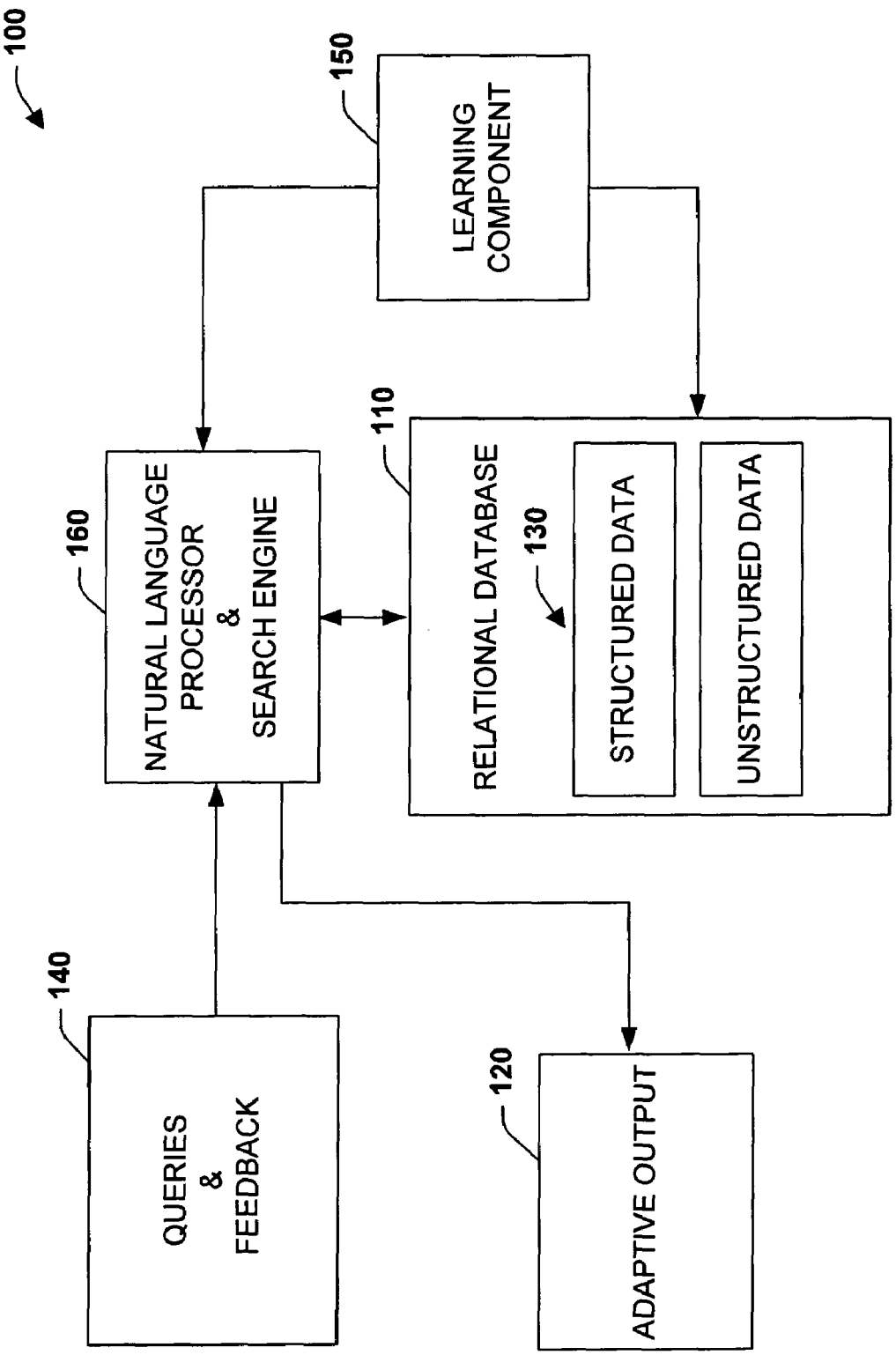
FIG. 1 is a schematic block diagram illustrating an adaptive information retrieval system in accordance with an aspect of the subject invention.

Referring initially to FIG. 1, an adaptive information retrieval system 100 is illustrated in accordance with an aspect of the subject invention. The system 100 includes a natural language processor and search engine 160 (also referred to as engine) that retrieves information from a database 110. The database 110 can include structured and unstructured data types at 130, wherein structured refers to data having descriptive data, metadata or parameters describing the data. In general, the database 110 is a relational database such as a Structured Query Language (SQL) database to allow system scalability although other type database systems can be employed. A learning component 150 is adapted to the database 110 or the engine 160 in order to facilitate information retrieval in an adaptive and efficient manner. For instance, users can submit queries 140 or other type feedback to the engine 160, where the learning component 150 can be trained over time. In accordance with such training, the system can adapt to the information retrieval problem at hand in a dynamic and efficient manner to produce more direct answers to queries rather than merely provide a locator to another source of information. In this manner, adaptive output 120 can be generated for users or systems that is more in line with the actual goal of the query 140 which is to determine some specific information or knowledge.

To illustrate one specific example of an information retrieval problem, the relational database 110 could be associated with a target application. It is to be appreciated however, that the database 110 can be associated with remote sites or applications, local sites, and/or a combination thereof. Within the application, the user may invoke a help utility that allows for data searches of specific information with respect to the given application. In one case, the user may be operating a graphics application and be querying a help index for knowledge on object rotation or some other object manipulation activity. Given the nature of the type of help being sought, the type of query, and/or the type of data in the database 110 it is possible to infer or determine that the user is attempting to manipulate the object within the application. Thus, rather than merely pull up a text file to help the user manipulate the object, the system 100 can infer that a particular application activity is desired via the learning component 150 and thus invoke/manipulate the object activity directly rather than point to some other indirect data describing the activity. In this manner, the system can adapt to satisfy the user's actual knowledge goal which then mitigates users having to perform further or additional research and query activities.

In another example, the nature of the structured data or unstructured data 130 itself may lead to an inference of the user's informational goal (e.g., the query terms trigger metadata relationships that lend support to what type of knowledge the user is actually seeking). As will be described in more detail below, various learning systems and algorithms can be applied by the learning component 150 and the engine 160 to facilitate the adaptive processes described above.

Before proceeding, it is noted that various machine learning techniques or models can be applied by the learning component 150. The learning models can include substantially any type of system such as statistical/mathematical models and processes for modeling users and determining results including the use of Bayesian learning, which can generate Bayesian dependency models, such as Bayesian networks, naïve Bayesian classifiers, and/or other statistical classification methodology, including Support Vector Machines (SVMs), for example. Other types of models or systems can include neural networks and Hidden Markov Models, for example. Although elaborate reasoning models can be employed in accordance with the present invention, it is to be appreciated that other approaches can also be utilized. For example, rather than a more thorough probabilistic approach, deterministic assumptions can also be employed (e.g., no dwelling for X amount of time of a particular web site may imply by rule that the result is not relevant). Thus, in addition to reasoning under uncertainty, logical decisions can also be made regarding the status, location, context, interests, focus, and so forth.

Learning models can be trained from a user event data store (not shown) that collects or aggregates contextual data from a plurality of different data sources. Such sources can include various data acquisition components that record or log user event data (e.g., cell phone, acoustical activity recorded by microphone, Global Positioning System (GPS), electronic calendar, vision monitoring equipment, desktop activity, web site interaction and so forth). It is noted that the system 100 can be implemented in substantially any manner that supports personalized query and results processing. For example, the system could be implemented as a server, a server farm, within client application(s), or more generalized to include a web service(s) or other automated application(s) that interact with search functions such as a user interface (not shown) for the search engine 160.

Figure 2:
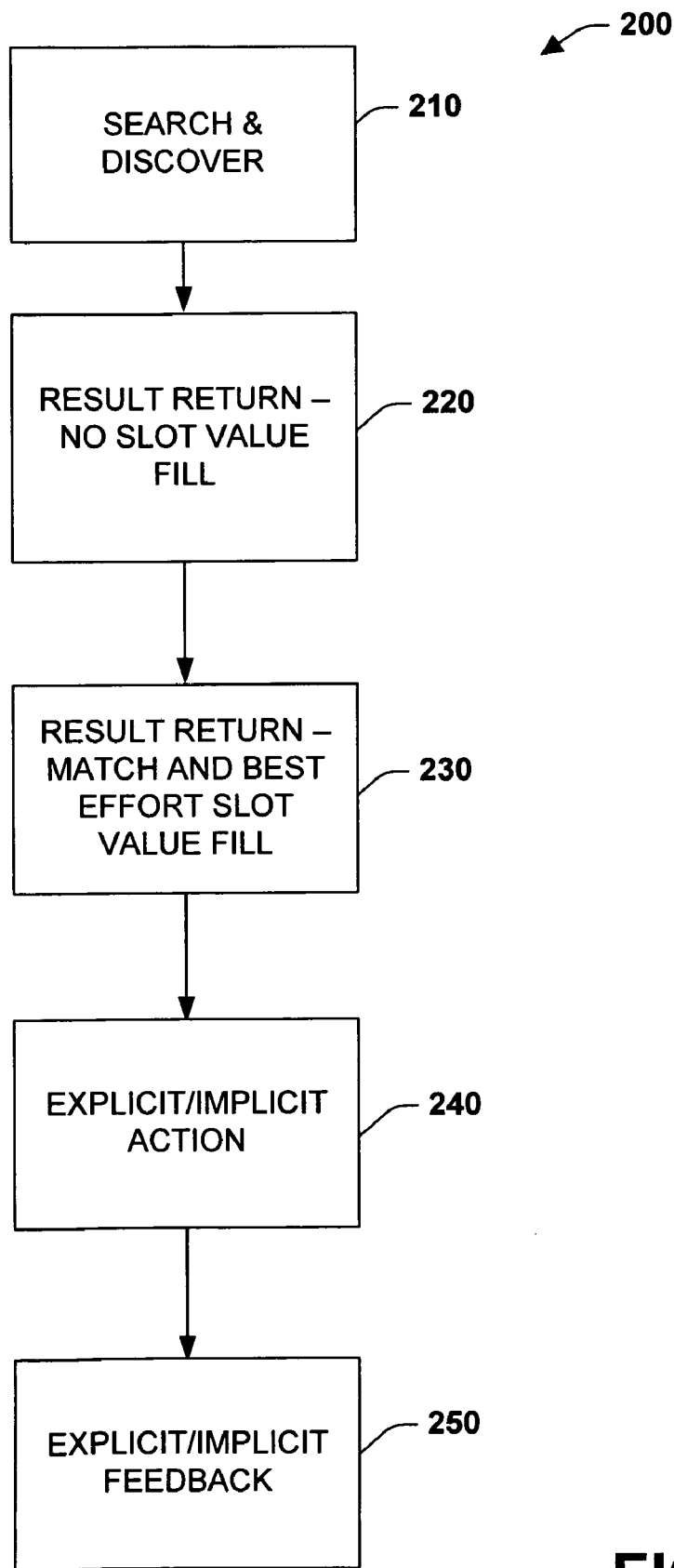
FIG. 2 is a flow diagram illustrating an adaptive information retrieval process in accordance with an aspect of the subject invention.

FIG. 2 illustrates an adaptive information retrieval process 200 in accordance with an aspect of the subject invention. While, for purposes of simplicity of explanation, the methodology is shown and described as a series or number of acts, it is to be understood and appreciated that the subject invention is not limited by the order of acts, as some acts may, in accordance with the subject invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

The process 200 illustrates various stages or phases that can be employed in the adaptive learning and searching processes described above with respect to FIG. 1. Proceeding to 210 of FIG. 2, a search and discover phase is provided. At this stage, inputs are matched to a variety of features such as in the following examples:

1. Assets (Documents, Programs) and Asset Collections on items such as query terms, index terms, time and age, page rank, topological placement and so forth.

2. Asset Structure: Individual Slots of each Asset and their associated values or Named Entity types. This involves
   i. The slot names, their types and their values
   ii. The slot relationships
   iii. Asset Collection structural relationships 3. Input feedback and its mappings into "matching" algorithms described below. Generally, there are many examples of how to combine multiple features where it is possible each feature can evaluate its confidence scores separately using distinct algorithms.

Typically, there are at least two "feature" evaluation mechanics including:
   i. Information Retrieval (IR) across the data corpus and its properties.
   ii. Query Feedback Property.

The "Query Feedback" property is generally treated separately (even though it is part of the Asset/Document) because of the nature of feedback being specific and direct to intent satisfaction. For this reason, the property "Query Feedback" using a Naïve Bayesian model to develop the confidence of the input to output map, and then the output confidence can be interleaved (1:1) with this property.

One of the goals of the search systems describe herein is to provide users with the best possible answers for their questions. A major component of this goal is providing the best possible ranking of web pages or other information sources. Typically, each page has a Static Rank which is a measure of how well-linked to the page is. This rank is independent of the query term(s). Also, each page has a Quality of Page that is a measure of the inherent quality of a page. This rank is also independent of the query term(s). Within the context of a given query, pages have a Quality of Match which is a measure of how well the contents and meta-data of the page match the query.

A Dynamic Ranker calculates the Quality of Match for a page and a given query. It then combines the Quality of Match score with the Static Rank and Quality of Page score to arrive at the Overall Rank. For the most part, this is the value by which pages are sorted when results are shown to the user. Overall Rank is calculated as a normalized weighted sum of Static Rank, Quality of Page, Junk Page Probability, and Quality of Match, for example. Quality of Match is in turn also a normalized weighted sum of a number of similarity functions. In the following example, the following definitions may apply:

Define the following as:
Q is a Query;
D is a Document;
$k_i \in N$ is a integer coefficient;
$QW(Q) \in N$ is a function of the query that returns an integer;
staticrank(D)∈[0,1];
QoP(D)∈[0,1];
JPP(D)∈[0,1]
QoM(Q,D)∈[0,1] is a similarity function between Q and D that returns a real-valued number between 0 and 1.

Overall Rank is calculated via the following algorithm, which is a normalized weighted sum:

$$\text{rank}(Q, D) = \frac{k_1 \text{staticrank}(D) + k_2 QoP(D) + k_3 JPP(D) + QW(Q) \cdot QoM(Q, D)}{k_1 + k_2 + k_3 + QW(Q)} \quad (1)$$

Where

In a Scoring file, coefficients $k_i$ are named:
$k_1$ MSNRankCoefficient
$k_2$ QualityOfPageCoefficient
$k_3$ JunkPageProbCoefficient
QW(Q) (note that this is not QualityOfMatchCoefficient)
A feature to the dynamic ranker is to weight the QualityOfMatch depending on the length of the query, as well as the rarity of terms contained in the query. Define the following as:
   $words_i(Q) \in Z$ as a function that returns the number of words in query Q that have property i;
   P is a set of properties. Currently, these are AnyWord, RareWord, and CommonWord. $words_{AnyWord}(Q)$ returns the number of words in the query.
   $w_i$ as the weight of property i;
   $w_0$ as the base weight; this is the QualityOfMatchCoefficient Then define QW(Q) as:

$$QW(Q) = w_0 + \sum_{i \in P} w_i words_i(Q)$$

In the Scoring file, the coefficients $w_i$ are named:
$W_{AnyWord}$ QualityIncrForEachWord
$W_{RareWord}$ QualityIncrForEachRareWord
$W_{CommonWord}$ QualityIncrForEachCommonWord Proceeding to 220 of FIG. 2, a second stage or phase is described where a match is found and no slot fill is attempted. At this point, the system can return the results or go into the next stages described below. This is a decision point left up to the nature of the application to drive completion of intent fulfillment. Again, it is dependent on the nature of the data being reasoned over—that is—if the asset collections in question have structural elements to them or values to these structural elements.

At 230, this stage includes match and best efforts at slot value fill. At this point, the system can return the results or go into the next stages. This is a decision point left to the nature of the application to drive completion of intent. Verbs of action can also be classified at this stage. This may include search verbs that are available in most applications—be it server or client. Most data presented today has a "SEARCH" and "PRESENT" aspect to it. The data can exist in files of varying structure or it can exist in a database. Search verbs in databases have basically a SELECT, WHERE and MERGE/JOIN aspect to them. They have higher level abstractions—called OLAP cubes—but at the end submit TSQL to the system. Note there is generally no limitation within this SEARCH verb to not construct a QUERY that spans one or more databases across one or more machines.

Search verbs in files that have XML structures have an XML Query aspect to them. The files can be of varying entity type of varying internal relationships—samples are MAML, ACW, other types (EMAIL, CONTACT, and so forth). Other verbs include command and control verbs which are related to various portions of application logic (e.g., cut, paste, rotate, fill, and so forth).

Proceeding to 240 of FIG. 2, this stage relates to explicit or implicit actions. When slot filling has been invoked, action verbs are then invoked within the application space. The filling out of the slots again—is a best effort guess of the system. It may employ:

1. Restatement
2. Dialog between the user to state the intent and clarify the slot fill.
3. Action—Plan the action such that the ACTION is fewer clicks away. Planning as opposed to procedural wizard logic leads to the shortest path between intent and action. The stages utilize a programmed level of confidence on the mapping accuracy and slot filling accuracy. Based on the means of "communication" between the application user and the application flow logic—the confidence levels can be assuaged and this process can be automated.

Proceeding to 250, a feedback stage is illustrated. This is referred to as the relevance feedback model. It depends where, when and how to apply relevance feedback. Some prefer it at processing stages, some at reasoning stages, some at query construction and guidance stages. Generally, this is the stage where feedback and analysis tell how searches are progressing.

The complexity that occurs is that the level of feedback that can be solicited is dependent primarily on:

1. Application UI limitations.
2. User Participation and Statistical Sampling rates.
3. Principled feedback to the moving parts in the prior stages.

This stage, its metrics and measurement and the models of feedback are related to impacting the moving parts—from IR to Learning to Classification to Routing.

Figure 3:
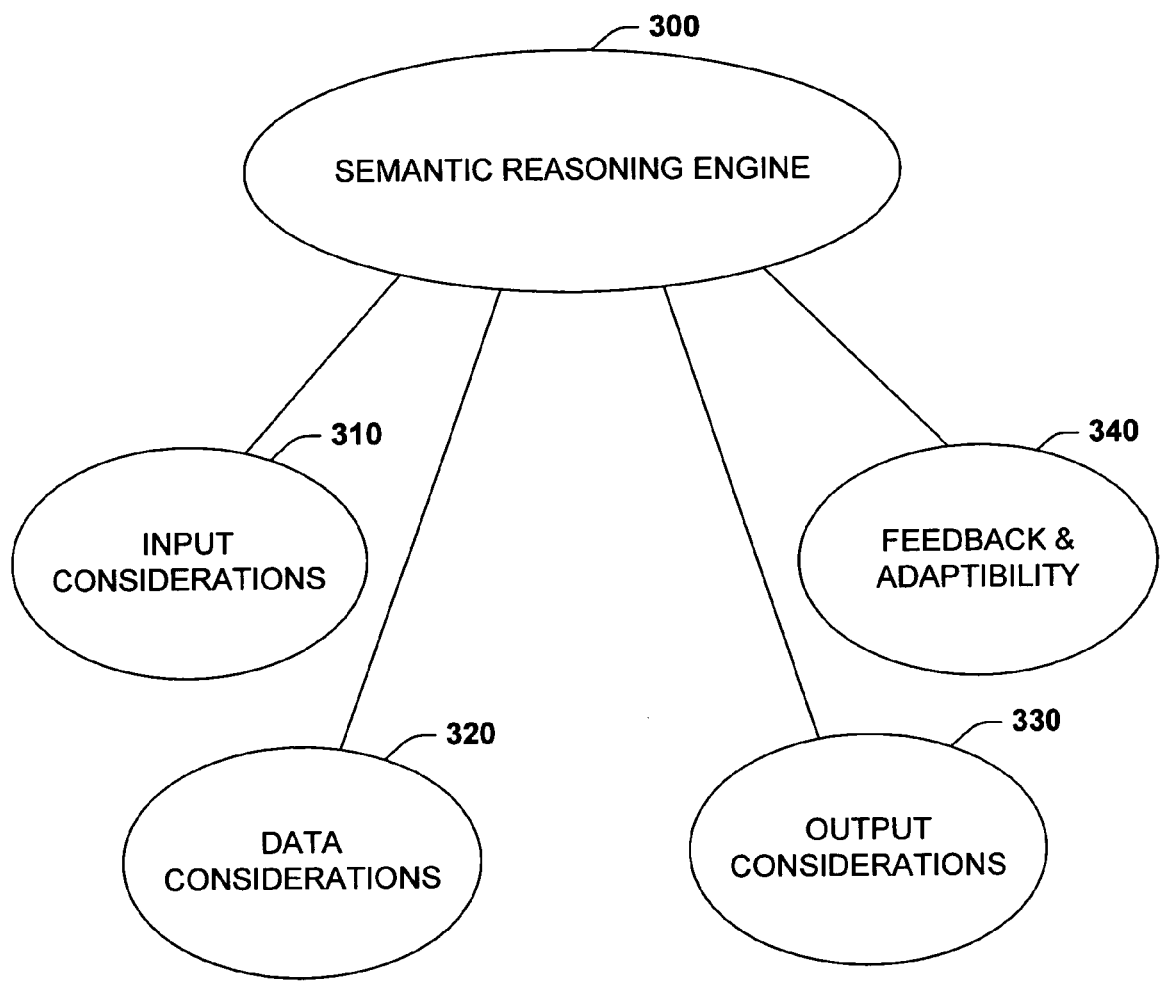
FIG. 3 illustrates semantic reasoning engine considerations in accordance with an aspect of the subject invention.

Turning to FIG. 3, semantic reasoning engine considerations 300 are illustrated in accordance with an aspect of the subject invention. At 310, input considerations include input routing, scope, and interface comprehensiveness. For routing, there is a "routing" component to allow data to be fully available to the reasoning engine and also to determine what are suitable routing end points. Routing tables, classifiers are all means for "sending" the input to other sources of reasoning. Also, the routing tables can be as intelligent or as hard coded as desired. Input scope relates to the application to selectively make use of input scope—which is both EXPLICIT and IMPLICIT. The reasoning system should be given both types for reasoning and make it open to the application to be able to BIAS or STATE the nature of input but should make no special demands on the applications to provide them. Interfaces should at a minimum provide for command line entry capabilities and allow for both input and output operations.

At 320, data considerations include data that is being reasoned over—structural and unstructured—and should be contained with the reasoning system. Also, all or most data types should be considered during the reasoning process—from the most unstructured (TXT files) to the most structured (CODE FILES, DATABASES). Data can be routed to aggregate the inference (reasoning) from disparate systems of different levels.

At 330, various output considerations are provided. In this case, a reasoning engine can have varying levels of visibility into each end routing point. For data that it reasons over, it is more or less self-contained. For data routing end points, this can be provided by respective applications. This type of routing can relate to input feedback, data aggregation, duplicate removal, and so forth. At 340, feedback should be collected from users and or other portions of the system in an efficient manner. This includes providing adaptive interfaces that can collect feedback without placing undue burdens on users. For instance, it can be determined or inferred whether a given data source is valuable or not to a user based upon the type of interactivity the user has with the given source (e.g., if a user inspects a potential information source or quickly discards it can be used as quality feedback evidence relating to the source).

Figure 4:
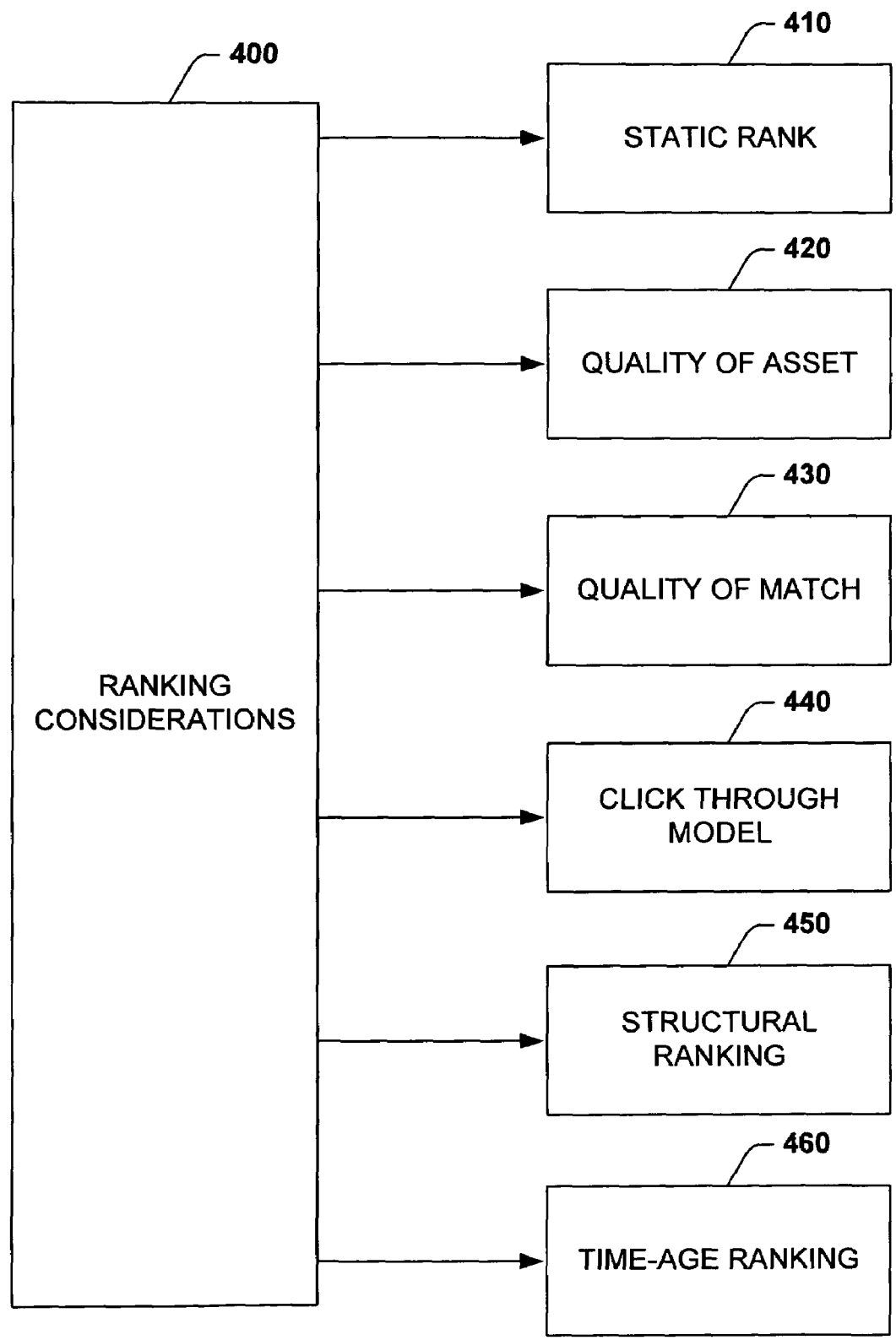
FIG. 4 illustrates general ranking considerations in accordance with an aspect of the subject invention.

FIG. 4 illustrates general ranking considerations 400 in accordance with an aspect of the subject invention. In this aspect, several criteria can be employed when automatically ranking information. At 410, each Asset has a Static Rank which is a measure of how well-linked to the page is. This rank is generally independent of the query term(s). At 420, each Asset has a Quality of Asset that is a measure of the inherent quality of the information asset. This rank is also independent of the query term(s). At 430, within the context of a given query, assets have a Quality of Match which is a measure of how well the contents and meta-data of the page match the query. This is a combination of multiple factors.

$QoM(Q,A) \in [0,1]$ is a similarity function between Q and A that returns a real-valued number between 0 and 1. Closer examination of a generic Search Rank function for Quality of Match shows a variety of "heuristic" contribution factors and largely 0-1 range computation achieved this method of normalization. It is generally not a probabilistic distribution where the computation over the entire return result set adds to 1. Thus it is generally not mathematically correct to combine the linear computation.

At 440, within the context of the given query, there is a Query Click through generated model. This model could be combined with a Quality of Match function. At 450, a structural ranking is a set of heuristic functions that provide a ranked match on how well the structure of the assets match the query and at 460, a time-Age ranking can be considered.

The reasoning system and engines described above can include a Dynamic Ranker that calculates the Quality of Match for a page and a given query. It then combines the Quality of Match score with the Static Rank and Quality of Page score to arrive at the Overall Rank. For the most part this is the value by which pages are sorted when results are shown to the user.

Overall Rank is calculated as a normalized weighted sum of Static Rank, Quality of Page, Junk Page Probability, and Quality of Match. Quality of Match is in turn also a normalized weighted sum of a number of similarity functions. The Overall Rank Equation is expressed as follows:

Q is a Query;
D is a Document or Asset;
$k_i \in N$ is a integer coefficient;
$QW(Q) \in N$ is a function of the query that returns an integer;
$staticrank(A) \in [0,1]$;
$QoA(A) \in [0,1]$;
$JPP(A) \in [0,1]$
$QoM(Q,A) \in [0,1]$ is a similarity function between Q and A that returns a real-valued number between 0 and 1.
$QoF(Q,A) = Pr(asset|query) \in [0,1]$ is a similarity function between Query and Asset generated on the basis of query click through feedback
$QoS(Q,S) \in [0,1]$ is a similarity function between Q and S—S being the structure and structural relationships that return a real-valued number between 0 and 1.

Overall Rank is calculated via the following algorithm, which is a normalized weighted sum:

$$rank(Q, A) = \frac{k_1 StaticRank(A) + k_2 QoA(A) + k_3 JPP(A) + QW(Q) \cdot (k_4 QoM(Q, A) + k_5 \cdot \alpha \cdot QoF(Q, A) + k_6 \cdot \beta \cdot QoS(Q, AS))}{k_1 + k_2 + k_3 + +QW(Q) \cdot (k_4 + k_5 + k_6)} \quad (3)$$

where in the Scoring file, the coefficients $k_i$ are named:
$k_1$ StaticRankCoefficient
$k_2$ QualityOfPageCoefficient
$k_3$ JunkPageProbCoefficient
$k_4$ IRRankCoefficient
$k_5$ QueryFeedbackProbCoefficient
$k_6$ StucturedIRCoefficient
and where
α. Is the confidence level for the feedback model training.
β Is the confidence level for the structural model training.

Figure 5:
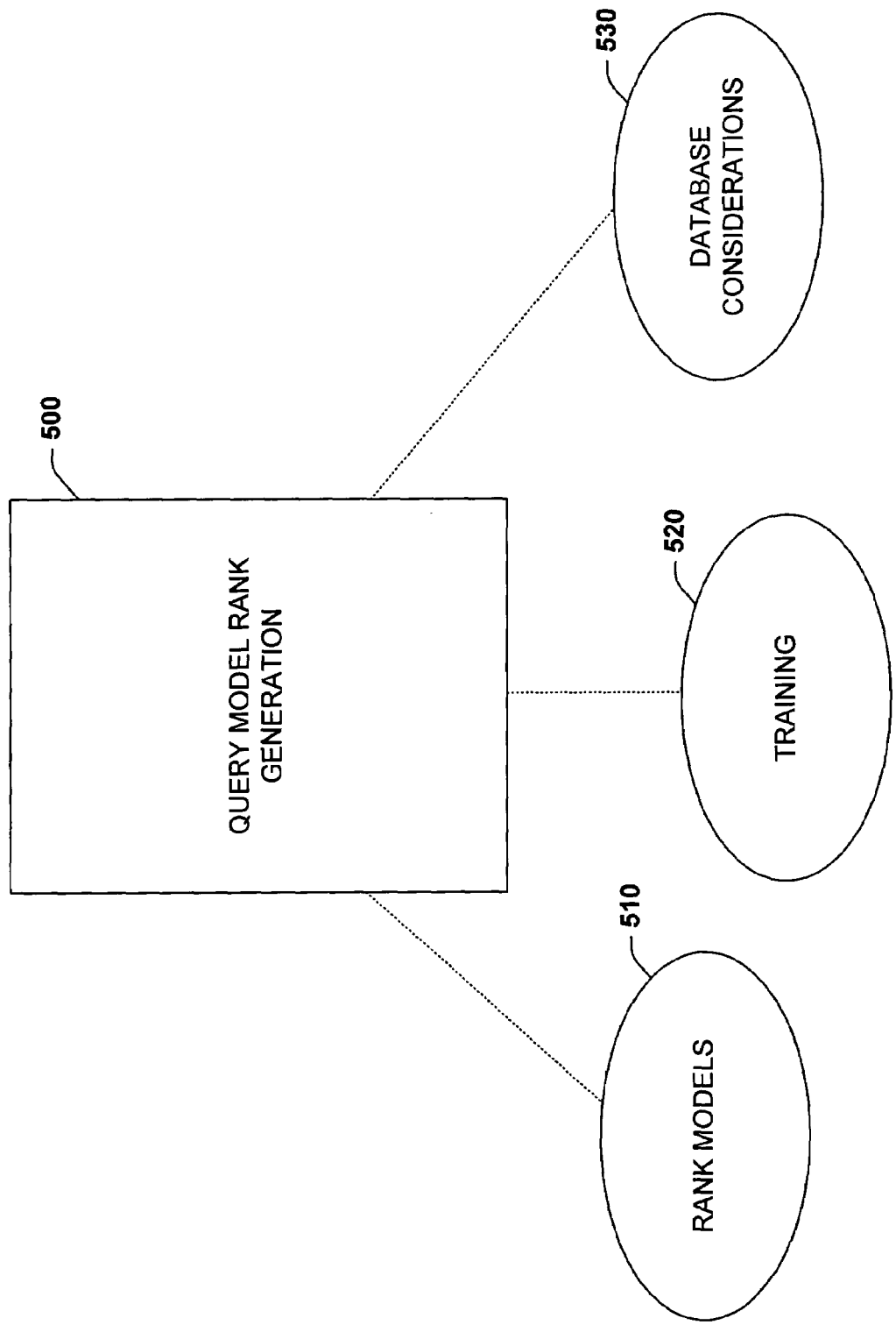
FIG. 5 illustrates query model rank generation in accordance with an aspect of the subject invention.

FIG. 5 illustrates query model rank generation considerations 500 in accordance with an aspect of the subject invention. In this aspect, the term "classifier" refers to the query modeling component of a reasoning engine. It uses past query click-through data to compute the probability of a document given a query, or Prob(doc|query). This probability can be used to rank documents returned by the classifier. Multiple techniques can be employed (e.g., MaxEnt, Vector, OKAPI, Bayesian, and so forth).

At 510, a probability (Rank Confidence) as computed with the "naïve bayes" formula can be determined. The naïve bayes uses a "Bernoulli" event model, in which queries are represented mathematically with V bits $w_1 \ldots w_v$, where $w_i=1$ if the $i^{th}$ word occurs in the query, and $w_i=0$ otherwise. V is typically large, so a sparse representation of the bit string is used in practice. The naïve bayes formula is:

$$Pr(asset | query) = \frac{PR(asset, query)}{Pr(query)} = \frac{Pr(asset)Pr(query | asset)}{Pr(query)}$$

where $$Pr(query | asset) = \prod_{w_i \in query} Pr(w_i = 1 | asset) \prod_{w_i \notin query} Pr(w_i = 0 | asset)$$

If the query contains Q terms, the straight-forward computation of Pr(query|doc) involves a product over the Q terms in the query, and the (V-Q) remaining terms. This is an O(V) computation. However, Pr(query|doc) can be rewritten in the following manner:

$$Pr(query | asset) = cache(asset) \frac{\prod_{w_i \in query} Pr(w_i = 1 | asset)}{\prod_{w_i \in query} Pr(w_i = 0 | asset)}$$

$$cache(asset) = \prod_{w_i \in \{1, \ldots V\}} Pr(w_i = 0 | asset)$$

The rewritten version caches the probability of not seeing any words with a given document, and then adjusts the cached probability according to what actually occurs in the query. The cache is independent of a given query, and can be pre-computed at training time. At runtime, given a query with Q terms, the re-factored computation is O(Q). In practice, it is more convenient to perform this computation as a summation of logarithms of probabilities, instead of as a product of probabilities.

$$\log Pr(query | asset) = \log cache(asset) + \sum_{w_i \in query} termprob(i, asset)$$

$$termprob(i, asset) = \log Pr(w_i = 1 | asset) - \log Pr(w_i = 0 | asset)$$

The term probabilities are derived from the raw counts of the training set, which is comprised of click-through data.
freq(asset,w): This is the co-occurrence count of the word w with the document doc
freq(asset): This is the occurrence count of the document doc in the click-through training set
total: This is the total frequency of click-throughs in the training set Having any of these raw frequencies evaluate to 0 is undesirable for theoretical and practical reasons. Therefore, the frequencies are "smoothed" so that probability calculations will have non-zero results. This is accomplished by adding a small quantity to freq(doc,w) for possible doc and w, and adjusting freq(doc) and total to be consistent with freq(doc,w):

freq'(asset,w)=freq(asset,w)+ϵ freq'(asset)=freq(asset)+ϵV total'=total+ϵVA where A is the number of documents, V is the number of words in our vocabulary, and ϵ is a small constant; we use ϵ=0.005. The smoothed counts are then used to compute the probabilities shown below.

Pr(asset)=freq'(asset)/total'

$Pr(w_i=1|asset)$=freq'(asset,$w_i$)/freq'(asset)

$Pr(w_i=0|asset)=1-Pr(w_i=1|asset)$

Termprob can be then be re-factored using the smoothed probabilities as follows:

termprob($i$,asset)=log(freq'(asset,$w_i$))−log(freq'(asset)−freq'(asset,$w_i$))

While the original goal of this computation is the conditional probability Pr(asset|query), the joint probability Pr(asset, query) is more efficient to compute—it generally requires no normalization over the documents—and can be computed with three functions defined earlier:

$$\log Pr(\text{asset, query}) = \log Pr(\text{asset}) + \log \text{cache}(\text{asset}) + \sum_{w_i \in \text{query}} \text{termprob}(i, \text{asset})$$

For a fixed query, the document ranking returned by log Pr(doc,query) is equivalent to the document ranking returned by Pr(doc|query). Using this above equation to sort in descending order provides a document ranking for the query model.

At 520 of FIG. 5, training aspects are considered. Training refers to the process of scanning the click-through data training set and populating the frequency tables for use in the naïve Bayes classifier. This process takes place offline. It can be assumed that the click-through data has the format:

<answer> <frequency> <query> where <answer> is an asset ID for the document clicked by the user, <frequency> is a positive floating point number, and query is the user's original query. The fields are separated by spaces or tabs, for instance.

At 530, database considerations include how to import classifiers. Since the classifier can be imported into SQL, the classifier data should be stored in SQL tables. Logically, two types of tables are processed to implement the naïve Bayesian classifier.

1. The class table. Each row represents one document. This should cover all the documents in the classifier training data. This has 3 columns:
   a. Document: the document ID
   b. log Pr(document)+log cache(document): Pr(document) and cache(document) are defined above
   c. termprob(null, document): termprob(null, document) is defined as termprob(w, document) when the raw freq(w, document) is zero. This termprob depends on the document, it is the same for any word such that freq(word, document) is zero. This saves from storing termprob(word, document) for word X document pairs that have not appeared in training data.

2. The feature-class table. This table represents all (document, feature) pairs that have occurred in training data. This has 3 columns:
   a. Document: the document ID
   b. Word: this can be a (tokenized) word, but you can be thought of as any generic feature in the query.
   c. Termprob(i, document).

Figure 6:
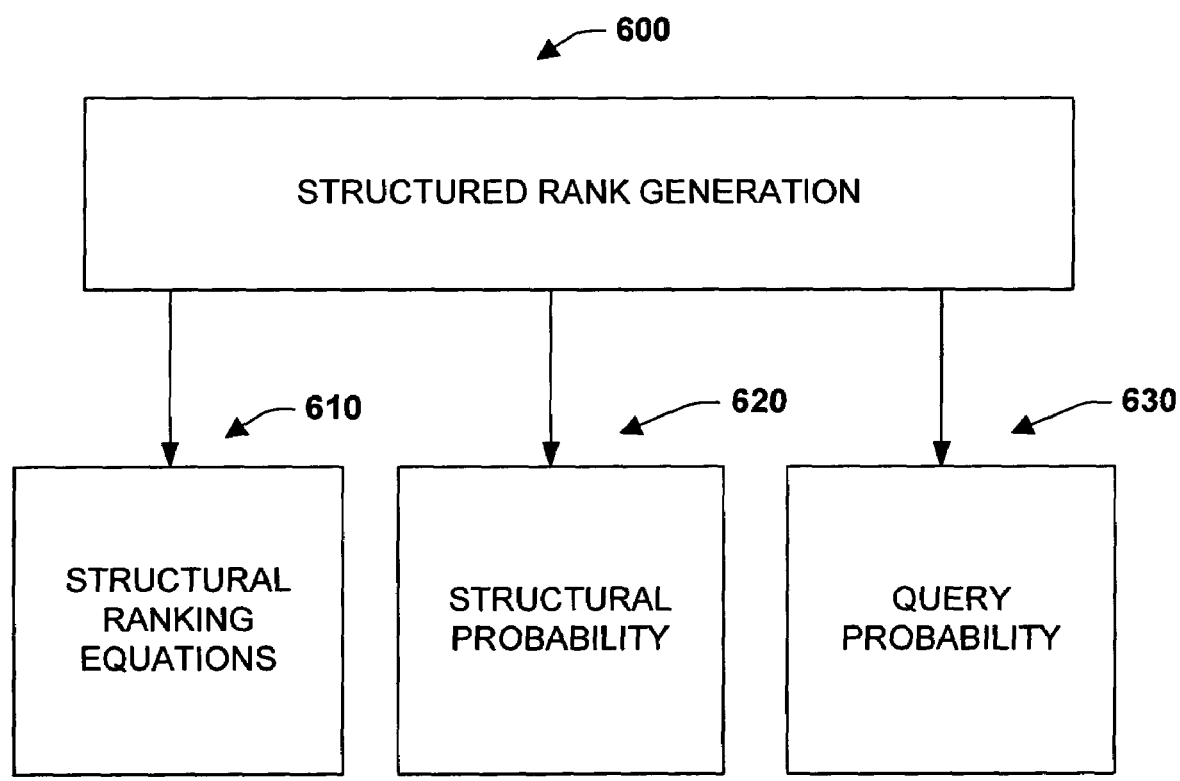
FIG. 6 illustrates structured rank generation in accordance with an aspect of the subject invention.

FIG. 6 illustrates structured rank generation 600 in accordance with an aspect of the subject invention. In general, the distribution of overall "structural rank" does not sum to 1 thus not making the rank generation from the structural system simply numeric but normalized. The listed factors below impact two areas that contribute to overall ranking at 610— structural prediction models (Structural Probability) and then query to structural mapping (Query Probability).

The influencing factors are listed as follows: Annotations; Corpus Statistics; NLG information (syntactic or type recognition): Heuristics: Top Node; Coverage; Compactness; Depth; Inheritance; Attachment; Dangling Relationships; and State information.

The overall Ranking 610 is derived from an equation to predict the most probable Semantics S given the Query Q from:

$$P_{\text{Max}}(S|Q) = \left[\frac{P(S)P(Q|S)}{P(Q)}\right]_{\text{Max}} = \text{argmax}[P(S)P(Q|S)]$$

This is the probability of getting the full semantic tree given the query. In the spirit of factoring out various models, break apart the structural probability into:

$$P(S) = \lambda P_{Heuristic}(S) + (1-\lambda) P_{Statistical}(S)$$

The statistical structure probability is obtained using:

$$P_{Statistical}(S) = P(T_t) * \prod_{j=1}^{Levels} P_j(T_t, \overline{T_{t,p}} | T_t) * \prod_{i \in T_i = NULL} P(T_i = NULL)$$

in this case $\overline{T_{t,p}}$=properties on type $T_t$

The last term penalizes items that end up being ignored in the semantic solution. Using the trigram approximation, $$P_{Statistical}(T_t, \overline{T_{t,p}} | T_t) \approx P_{TRI}(T_t, \overline{T_{t,p}}) * \Pi P_{Statistical}(T_{t,p}, \overline{T_{(t,p_i),p}} | T_{t,p_i})$$

where $\overline{T_{(t,p_i),p}}$=properties on property $T_{t,p_i}$

At 620, structural probabilities are considered. The heuristic uses a heuristic related to compactness and schema distance. For now, there are a few options that consider Compactness, Schema Distance, Number of Leaf Nodes, Number of nodes that had to be artificially created. The heuristic options used here can be for example: Top Node; Coverage; Compactness; Depth; Inheritance; Attachment; and Dangling Relationships. The following shows an example equation:

$$P_{Heuristic} = \frac{\#\text{Semantic Nodes}}{\#\text{Nodes}} \quad (\text{option 1})$$

$$= Penalty^{\#\text{Created Nodes}} \quad (\text{option 2})$$

$$= \frac{\#\text{Nodes}}{\#\text{Leaf Nodes}} \quad (\text{option 3})$$

$$= \frac{\#\text{Semantic Nodes}}{\#\text{Leaf Nodes}} \quad (\text{option 4})$$

At 630, query probabilities are considered. The aspect here is to predict the query given the structure. In a generational model assume that:

$$P(Q|S) = \prod_i P(w_i|S) \approx \prod_i P(w_i|T_i)$$

This approximation is useful in that the probability of a word is only determined by its local context. The probability is a function of three things: Annotations; Corpus Statistics; and NE or Blurb information including Top Node; Coverage; Compactness; Depth; Inheritance; Attachment; and Dangling Relationships. Some heuristics can be employed to obtain the NE or Blurb terms:

$$P(w_i|T_i) = \lambda P_{Heuristic}(w_i|T_i) + (1-\lambda) P_{CorpusStat}(w_i|T_i)$$

For the heuristic component:

$$P_{Heuristic}(w_i|T_i) = f(w_i \in NE, w_i \in Blurb, w_i \in Annotation)$$

where the function returns constants depending on the membership. These constants should be close to one and bias NEs the highest, followed by Blurbs.

Figure 7:
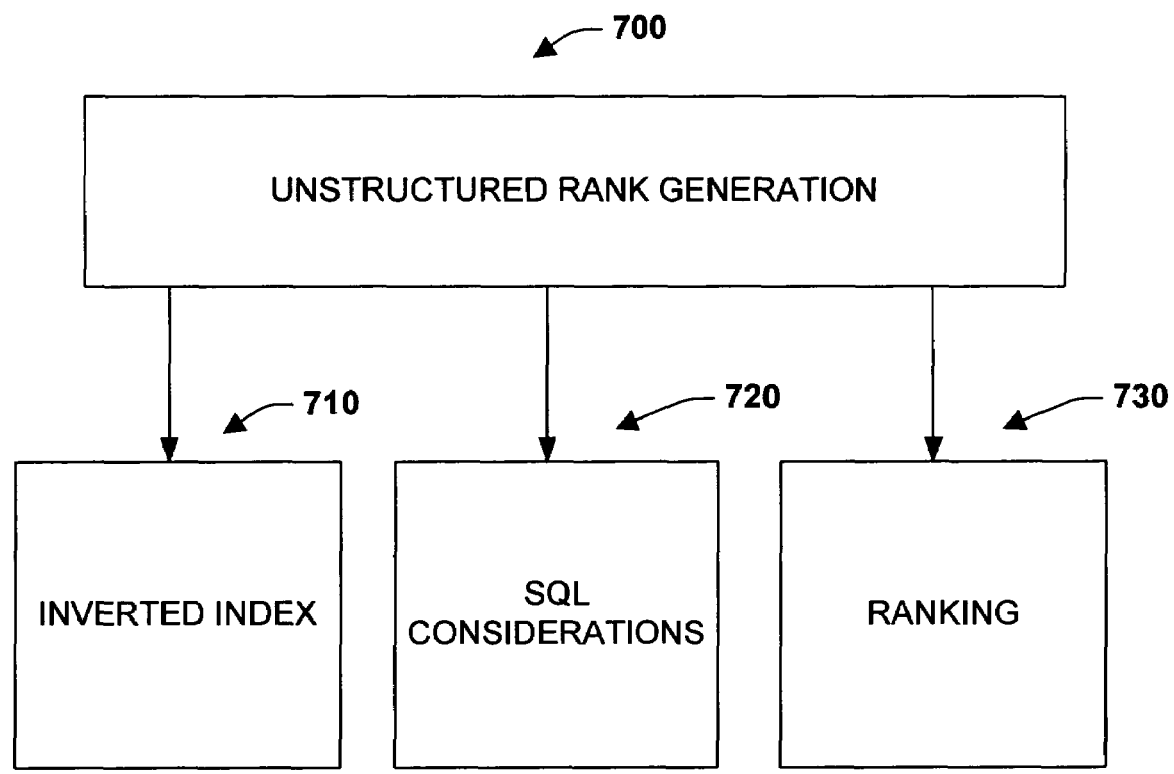
FIG. 7 illustrates unstructured rank generation in accordance with an aspect of the subject invention.

The various scenarios include:
1. $w_i$ is NE→NE is Annotation
   a. $P(w_i|T_i) = \lambda * 1.0 + (1-\lambda) * 0$
2. $w_i$ is blurb
   a. $P(w_i|T_i) = \lambda * 0.9 + (1-\lambda) * 0$
3. $w_i$ is Annotation
   a. $P(w_i|T_i) = \lambda * 1.0 + (1-\lambda) * 0$
4. $w_i$ is Annotation and Corpus Stat
   a. $P(w_i|T_i) = \lambda * 1.0 + (1-\lambda) * P_{CS}(w_i|T_i)$
5. $w_i$ is Corpus Stat
   $P(w_i|T_i) = \lambda * 0 + (1-\lambda) * P_{CS}(w_i|T_i)$ FIG. 7 illustrates unstructured rank generation 700 in accordance with an aspect of the subject invention. At 710, an inverted index over a collection of documents consists of a set of inverted lists, one for each occurring word (index term). The inverted list for a term is a sorted list of locations (occurrences) where the term appears in the document collection. Typically, a B tree or B tree like structure is used to implement the inverted list collection. The occurrences list can have different granularities. Since some occurrences may be more important than others depending on where (such as in title, body or anchor text) the occurrence is located, search engines may weight occurrences differently during result ranking according to such information. In typical term based statistical ranking, number of occurrence within each document/property is generally required for coming up with a ranking score; therefore, the exact locations of the occurrences are not required in the index in regular search. However, exact location information may be needed for some advanced search scenarios such as "phrasal matching".

The sort order of the list is also a related topic. In a basic implementation, it is usually sorted by document id, so that multiple lists representing multiple terms in a query can be merged relatively efficiently to compute term based ranking score. Various optimization techniques (for example, skip lists, topN sort-by-rank lists) have been used depending on whether the query is an "OR query" (returning documents where any of the terms in the query has appeared) or "AND query" (returning only documents where all of the terms in the query have appeared.) In today's large scale web search engines, where the default query is typically "AND query" and there is usually a global ranking, at least part of the lists can be sorted according to the global ranking score, which allows merging to be efficient. In typical file-based inverted index implementation (where the inverted index is stored in a disk file), compression techniques can also be used to compress the occurrences lists, and therefore reduce the footprint of the index file. There is a performance trade off between being able to load less data per list and cache more data in the memory, and having to decompress at runtime.

At 720, SQL considerations are provided. Typical implementation of the Clustered Index in database systems such as SQL server is similar to, if not more sophisticated than, the B tree implementation mentioned above for inverted files. Therefore, if the occurrences lists are stored in a SQL table, create a clustered index with 'term' as the index field, desired performance should be achieved when retrieving the lists at runtime.

There are several alternatives in terms of the actual design of the table that include: a) Full list: The index key is the index term, and the value is the complete inverted list for that term. The list values could be compressed if needed; b) Single occurrence: The index key is the index term, and the value is a single occurrence in the list; c) Mixed list: Some combination of the two. For example, the index key is the index term; the value is the occurrence list of one single document. Part of reason of using such design is that a) term based statistical ranking usually calculates ranking score per <term, doc> pair; b) nearness calculation used in phrasal matching operates on <term, doc, location>.

At 730, basic ranking equations are provided. QoM(Q,D) $\in [0,1]$ is a similarity function between Q and D that returns a real-valued number between 0 and 1. QoM(Q,D)$\in[0,1]$ is the same as R in the equation below. The basic TermRank is expressed as:

$$S_1 \times S_3 \times \frac{tf}{K+tf} \times w \times \frac{qtf}{K_3 + qtf}$$

Where $$w = \log \frac{(r+0.5) \times (N-n-R+r+0.5)}{(R-r+0.5) \times (n-r+0.5)}$$

$$\left( \text{later modified as } w = \log \frac{(r+0.5) \times (N-R+r+0.5)}{(R-r+0.5) \times (n-r+0.5)} \right)$$

And $K = k_1 \left( (1-b) + b \times \frac{dl}{avdl} \right)$ $S_1 = k_1 + 1$ $S_3 = k_3 + 1$ where:

K1, K3 and b are constants. One recommended range for K1 is 1.2 to 2. The effect of choice of K1 is to determine the strength of the relationship between term weight and term frequency for document. A large value of K1 will make for a relation close to proportionality. A small value will mean that the term frequency has little impact on the weight. K3 is the query counterpart of K1; b is used for document length normalization; N is total document count in the index; n is occurrence count (i.e. work id count stored with the work id list); tf stands for term frequency; qtf stands for query term frequency; dl is document length; avdl is average document length; R stands for feedback document count; r stands for relevant document count.

Figure 8:
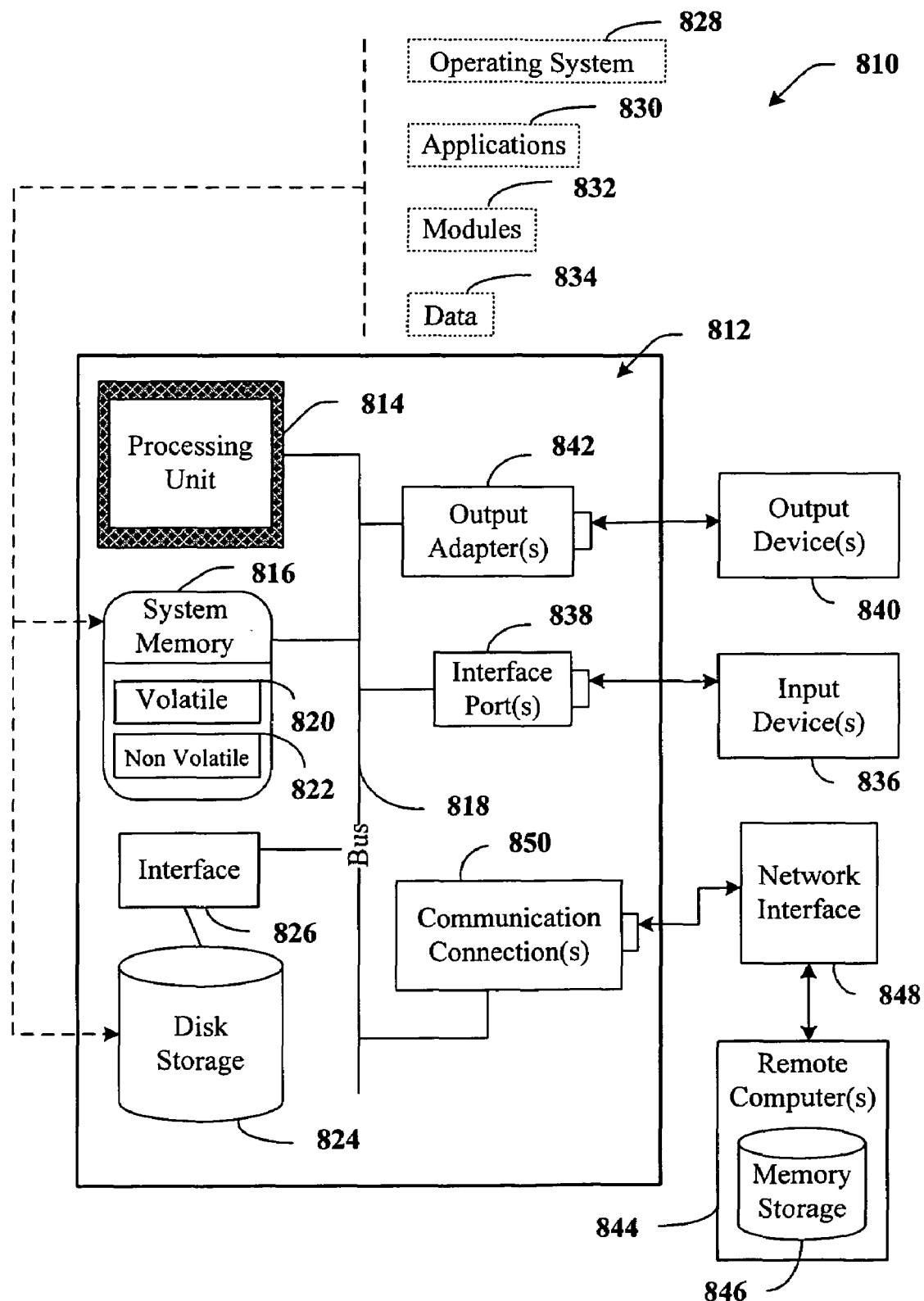
FIG. 8 is a schematic block diagram illustrating a suitable operating environment in accordance with an aspect of the subject invention.

With reference to FIG. 8, an exemplary environment 810 for implementing various aspects of the invention includes a computer 812. The computer 812 includes a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814.

The system bus 818 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA® Local Bus (VLB), Peripheral Component Interconnect (PCI), Universal Serial Bus (USB), Advanced Graphics Port (AGP), Personal Computer Memory Card International Association bus (PC-MCIA), and Small Computer Systems Interface (SCSI).

The system memory 816 includes volatile memory 820 and nonvolatile memory 822. The basic input/output system (BIOS), containing the basic routines to transfer information between elements within the computer 812, such as during staff-up, is stored in nonvolatile memory 822. By way of illustration, and not limitation, nonvolatile memory 822 can include read only memory (ROM), programmable ROM (PROM), electrically programmable ROM (EPROM), electrically erasable ROM (LEPROM), or flash memory. Volatile memory 820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), SYNCHLINK™ DRAM (SLDRAM), and direct RAMBUS® RAM (DRRAM).

Computer 812 also includes removable/non-removable, volatile/non-volatile computer storage media. FIG. 8 illustrates, for example a disk storage 824. Disk storage 824 includes, but is not limited to, devices like a magnetic disk drive, floppy disk drive, tape drive, JAZ® drive, ZIP® drive, LS-100 drive, flash memory card, or memory stick. In addition, disk storage 824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 824 to the system bus 818, a removable or non-removable interface is typically used such as interface 826.

It is to be appreciated that FIG. 8 describes software that acts as an intermediary between users and the basic computer resources described in suitable operating environment 810. Such software includes an operating system 828. Operating system 828, which can be stored on disk storage 824, acts to control and allocate resources of the computer system 812. System applications 830 take advantage of the management of resources by operating system 828 through program modules 832 and program data 834 stored either in system memory 816 or on disk storage 824. It is to be appreciated that the subject invention can be implemented with various operating systems or combinations of operating systems.

A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port may be used to provide input to computer 812, and to output information from computer 812 to an output device 840. Output adapter 842 is provided to illustrate that there are some output devices 840 like monitors, speakers, and printers, among other output devices 840, that require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a personal computer, a server, a router, a network PC, a workstation, a microprocessor based appliance, a peer device or other common network node and the like, and typically includes many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 850 refers to the hardware/software employed to connect the network interface 848 to the bus 818. While communication connection 850 is shown for illustrative clarity inside computer 812, it can also be external to computer 812. The hardware/software necessary for connection to the network interface 848 includes, for exemplary purposes only, internal and external technologies such as, modems including regular telephone grade modems, cable modems and DSL modems, ISDN adapters, and Ethernet cards.

Figure 9:
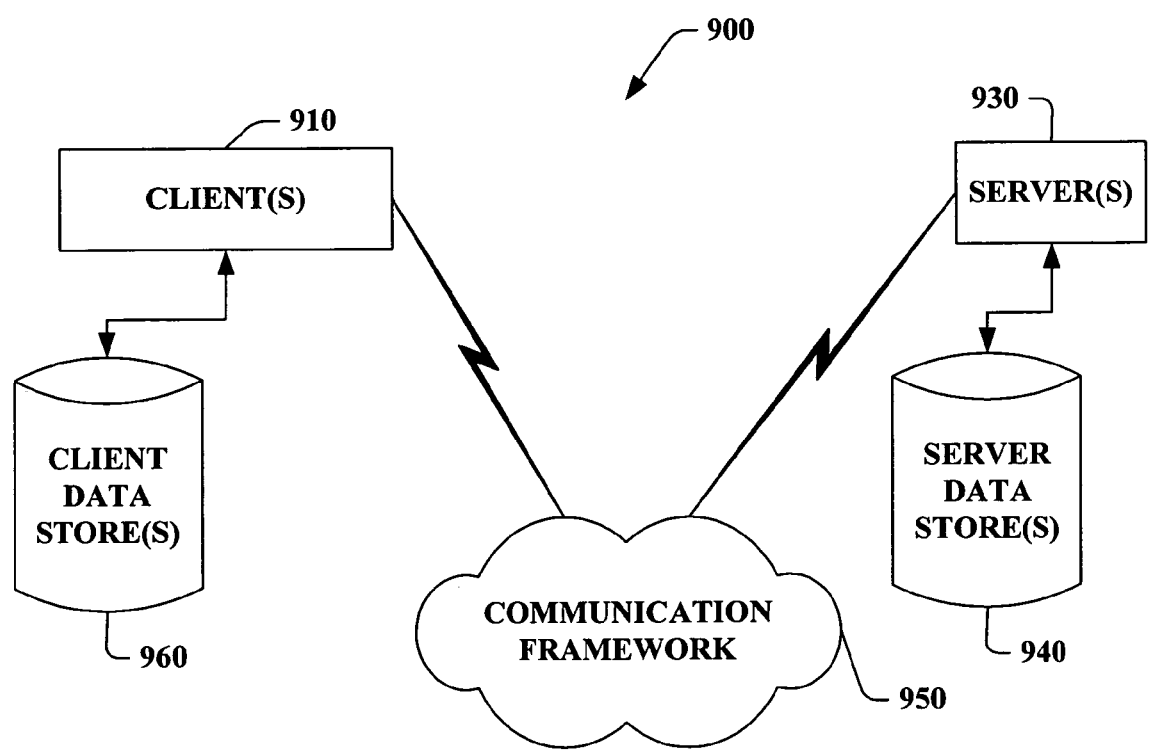
FIG. 9 is a schematic block diagram of a sample-computing environment with which the subject invention can interact.

FIG. 9 is a schematic block diagram of a sample-computing environment 900 with which the subject invention can interact. The system 900 includes one or more client(s) 910. The client(s) 910 can be hardware and/or software (e.g., threads, processes, computing devices). The system 900 also includes one or more server(s) 930. The server(s) 930 can also be hardware and/or software (e.g., threads, processes, computing devices). The servers 930 can house threads to perform transformations by employing the subject invention, for example. One possible communication between a client 910 and a server 930 may be in the form of a data packet adapted to be transmitted between two or more computer processes. The system 900 includes a communication framework 950 that can be employed to facilitate communications between the client(s) 910 and the server(s) 930. The client(s) 910 are operably connected to one or more client data store(s) 960 that can be employed to store information local to the client(s)

910. Similarly, the server(s) 930 are operably connected to one or more server data store(s) 940 that can be employed to store information local to the servers 930.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer comprising:
    a processing unit; and
    a computer readable storage medium storing:
        a database component that stores a plurality of assets, the plurality of assets including structured assets and unstructured assets, the unstructured assets not containing metadata describing data in the unstructured assets, the structured assets containing metadata describing data in the structured assets;
        a search engine that, when executed by the processing unit, causes the computer to perform a query on the plurality of assets; and
        a learning component that, when executed by the processing unit, causes the computer to:
            calculate ranks for assets in a result set, each asset in the result set being an asset in the database component satisfying the query, the ranks for assets in the result set based at least in part on feedback, the result set including at least one of the structured assets and at least one of the unstructured assets, the ranks for each structured asset in the result set being based at least in part on the metadata in the structured asset, higher ranked assets in the result set having a greater probability of being associated with a user's actual information goal, the user's actual information goal being that which a user actually wants to accomplish when the user submits the query; and
            take an action directly related to the user's actual information goal,
        wherein the learning component causes the computer to calculate the ranks for the assets in the result set at least in part by causing the computer to:
            calculate a static rank factor for each asset in the result set, the static rank factor for an asset being a measure of how well linked to the asset is, the static rank of the asset being independent of terms in the query;
            calculate a quality of asset factor for each asset in the result set, the quality of asset factor for an asset being a measure of an inherent quality of the asset, the quality of the asset being independent of the terms in the query;
            calculate a quality of match factor for each asset in the result set, the quality of match factor for an asset being a measure of how well contents of the asset and metadata of the asset match the query, the quality of match factor for the asset based at least in part on the past query click-through data; and
            calculate the ranks for each asset in the result set based at least in part on; the static rank factor for each asset in the result set, the quality of asset factor for each asset in the result set, and the quality of match factor for each asset in the result set.

2. The computer of claim 1, wherein the learning component, when executed by the processing unit, causes the computer to employ at least one Bayesian classifier to calculate the ranks for the assets in the result set.

3. The computer of claim 1, wherein the search engine, when executed by the processing unit, causes the computer to process natural language input to generate the query.

4. The computer of claim 1, wherein the feedback is implicit feedback.

5. The computer of claim 4, wherein the implicit feedback comprises the past query click-through data.

6. The computer of claim 1, wherein the database component is a relational database.

7. The computer of claim 1, wherein the learning component, when executed by the processing unit, causes the computer to calculate the ranks for assets in the result set based on types of queries, the structure of data in the database, or from implicit queries.

8. The computer of claim 7, wherein the learning component, when executed by the processing unit, causes the computer to perform the action by causing the computer to execute an application function based at least in part upon an inference of the user's actual information goal.

9. The computer of claim 1, wherein the computer readable storage medium further stores a dialog component that, when executed by the processing unit, causes the computer to initiate a dialog with the user to mitigate system uncertainty, the dialog includes at least one of stating an intent or clarifying a slot.

10. The computer of claim 1, wherein the learning module further comprises a semantic reasoning engine that, when executed by the processing unit, causes the computer to analyze implicit or explicit feedback from the user.

11. The computer of claim 1, wherein the computer readable medium further comprises instructions that, when executed by the processing unit, cause the computer to provide a user interface that collects the feedback from a user.

12. An automated information retrieval method comprising:
    receiving, by a computer, a query submitted by a user;
    obtaining, by the computer, a result set by performing the query on a relational database that stores a plurality of assets, the plurality of assets including unstructured assets and structured assets, the result set comprising each asset in the plurality of assets that satisfies the query, the result set comprising at least one of the structured assets and at least one of the unstructured assets, the unstructured assets not containing metadata describing data in the unstructured assets, the structured assets containing metadata describing data in the structured assets;
    calculating, by the computer, ranks for each asset in the result set, higher ranked assets in the result set having a greater probability of being associated with a user's actual information goal, the ranks for each structured asset in the result set being based at least in part on the metadata in the structured asset, the user's actual information goal being that which a user actually wants to accomplish when the user submits the query, the ranks for each asset in the result set based at least in part on past query click-through data; and presenting, by the computer, the assets in the result set to the user in an order based on the ranks for the assets in the result set, wherein calculating the ranks for each asset in the result set comprises:

calculating, by the computer, a static rank factor for each asset in the result set, the static rank factor for an asset being a measure of how well linked to the asset is, the static rank of the asset being independent of terms in the query;

calculating, by the computer, a quality of asset factor for each asset in the result set, the quality of asset factor for an asset being a measure of an inherent quality of the asset, the quality of the asset being independent of the terms in the query;

calculating, by the computer, a quality of match factor for each asset in the result set, the quality of match factor for an asset being a measure of how well contents of the asset and metadata of the asset match the query, the quality of match factor for the asset based at least in part on the past query click-through data; and calculating, by the computer, the ranks for each asset in the result set based at least in part on: the static rank factor for each asset in the result set, the quality of asset factor for each asset in the result set, and the quality of match factor for each asset in the result set.

13. The method of claim 12, wherein calculating the ranks for each asset in the result set comprises: for each asset in the result set, calculating, by the computer, a normalized weighted sum of the static rank of the asset, the quality of page factor of the asset, a junk page probability of the asset, and the quality of match factor of the asset.

14. A system memory comprising software that, when executed by a processing unit of a computer, causes the computer to:

use at least one index to obtain, at the computer, a result set by performing a query on a relational database, the query submitted by a user of the computer, the query containing query terms, the relational database storing a plurality of assets, the plurality of assets comprising unstructured assets and structured assets, the unstructured assets not containing metadata describing data in the unstructured assets, the structured assets containing metadata describing data in the structured assets, the result set comprising each asset in the plurality of assets that contains the query terms;

calculate, at the computer, an overall rank for each asset in the result set, assets in the result set having higher overall ranks are more likely to be associated with a user's actual information goal, the user's actual information goal being that which the user actually wants to accomplish when the user submits the query, the overall rank for each asset in the result set being equal to a quotient that results from dividing a numerator by a denominator, the numerator being a sum of:

a product of a static rank coefficient and a static rank factor for the asset, the static rank factor for the asset being a measure of how well linked to the asset is, the static rank factor of the asset being independent of the query terms, the static rank factor for the asset being a real number between 0 and 1;

a product of a quality of page coefficient and a quality of asset factor for the asset, the quality of asset factor for the asset being a measure of an inherent quality of the asset, the quality of the asset factor being independent of the query terms, the quality of asset factor for the asset being a real number between 0 and 1;

a product of a junk page probability coefficient and a junk page probability factor for the asset, the junk page probability factor for the asset being a probability that the asset is a junk page, the junk page probability factor for the asset being a real number between 0 and 1;

a product of a query weight and a quality of match factor for the asset, the query weight based on a length of the query and rarity of the query terms, the quality of match factor for an asset being a measure of how well contents of the asset and metadata of the asset match the query, the quality of match factor for the asset being a real number between 0 and 1, the quality of match factor for the asset being a sum of:

a product of an information retrieval rank coefficient and a similarity function factor, the similarity function factor measuring similarity between the query and the asset, the similarity function factor being a real number between 0 and 1, a product of a query feedback probability coefficient, a confidence level for feedback model training, and a probability of the asset given the query, wherein the probability of the asset given the query is based on past query click-through data, and a product of a structured information retrieval coefficient, a confidence level for structural model training, and a structural similarity factor for the asset, wherein the structural similarity factor for the asset is a measure of structural similarity between the query and a structure of the asset, the structural similarity factor for the asset being a real number between 0 and 1;

wherein the denominator is equal to a sum of:
the static rank coefficient,
the quality of page coefficient,
the junk page probability coefficient,
a product of the query weight and the information retrieval rank coefficient,
a product of the query weight and the query feedback probability coefficient, and
a product of the query weight and the structured information retrieval coefficient; and present, by the computer on an output device, assets in the result set to the user in an order based on the overall ranks for the assets in the result set.

15. The system memory of claim 14, wherein the software, when executed by the processing unit, further causes the computer to sort assets in the result set based on the overall ranks of the assets in the result set.

* * * * *

UNITED STATES PATENT AND TRADEMARK OFFICE
CERTIFICATE OF CORRECTION

PATENT NO.         : 7,627,564 B2                                    Page 1 of 1
APPLICATION NO.    : 11/157600
DATED              : December 1, 2009
INVENTOR(S)        : Qi Yao et al.

It is certified that error appears in the above-identified patent and that said Letters Patent is hereby corrected as shown below:

In column 15, line 25, delete "staff-up" and insert -- start-up --, therefor.

In column 15, line 29, delete "(LEPROM)" and insert -- EEPROM --, therefor.

In column 18, line 5, in Claim 1, delete "on;" and insert -- on: --, therefor.

Signed and Sealed this
Fifteenth Day of March, 2011

David J. Kappos
*Director of the United States Patent and Trademark Office*